Oct. 6, 1959 D. McNICOLL 2,907,144
DEVICE FOR LAPPING THE RACE MEMBERS
OF ANTI-FRICTION BEARINGS
Filed Dec. 23, 1957 3 Sheets-Sheet 1

Inventor
David McNicoll

By
Patent Agent

Oct. 6, 1959

D. McNICOLL 2,907,144

DEVICE FOR LAPPING THE RACE MEMBERS
OF ANTI-FRICTION BEARINGS

Filed Dec. 23, 1957

Inventor
David McNicoll

By
Patent Agent

United States Patent Office 2,907,144
Patented Oct. 6, 1959

2,907,144

DEVICE FOR LAPPING THE RACE MEMBERS OF ANTI-FRICTION BEARINGS

David McNicoll, Aston, Birmingham, England, assignor to British Timken Limited, Birmingham, England, a British company Application December 23, 1957, Serial No. 704,619

Claims priority, application Great Britain February 28, 1957

6 Claims. (Cl. 51—58)

This invention relates to means for rectifying distortion and expansion of the race members of anti-friction bearings, such as tapered roller bearings, and the invention is especially suitable for use with race members of the kind in which a portion of the outer periphery is used for locating purposes.

Bearings having race members of the last-mentioned kind are widely used for rotary and semi-rotary applications where high thrust and bending loads occur. The locating peripheral surfaces of the race members of such bearings are liable to become distorted in service due to the race periphery being expanded and taking a permanent set.

In the past, it has been the practice to rectify such distortions by a regrinding process on individual races using a conventional grinding machine. This method, apart from involving the use of costly equipment, has the drawbacks that it involves the return of individual races to a workshop where such grinding facilities are available, and the carrying out of an operation which calls for the exercise of a high degree of skill.

An object of the present invention is to provide means whereby expanded and distorted locating peripheries can be rectified by a simple lapping operation which is easily carried out by means of a portable hand-operated device.

According to the invention, means for rectifying expanded and distorted portions of the outer periphery of an anti-friction bearing race member consists of a hand-operated portable device which comprises a stationary base, supporting and clamping means adapted to hold securely the race member to be lapped above said base in located position with its axis vertical, and an external lap carrier ring carrying three equally spaced lapping tools having lapping surfaces directed radially-inwards and adapted to engage the full width of the said outer periphery of the race member, said external carrier ring being freely or floatingly supported by the stationary base so as to be restrained radially solely by the engagement of the lapping tools with the surface being lapped, and also, said external carrier ring being adapted to be rotated or oscillated by hand. The lapping tools may consist of pads radially-adjustable upon the lap carrier ring, and the latter may be provided with external handles whereby it may be conveniently oscillated by hand.

By way of example, a convenient method of and means for carrying out the invention will be described in connection with the intermediate race ring of a two-row tapered-roller thrust bearing of the kind comprising two outside race rings, an intermediate race ring, and two rows of tapered rollers interposed respectively between tracks on the intermediate ring and the outside rings, the outer periphery of said intermediate race ring including a portion which is intended for locating purposes and which it is desired to lap to rectify dimensional inaccuracies.

In the accompanying drawings.

Figure 1:
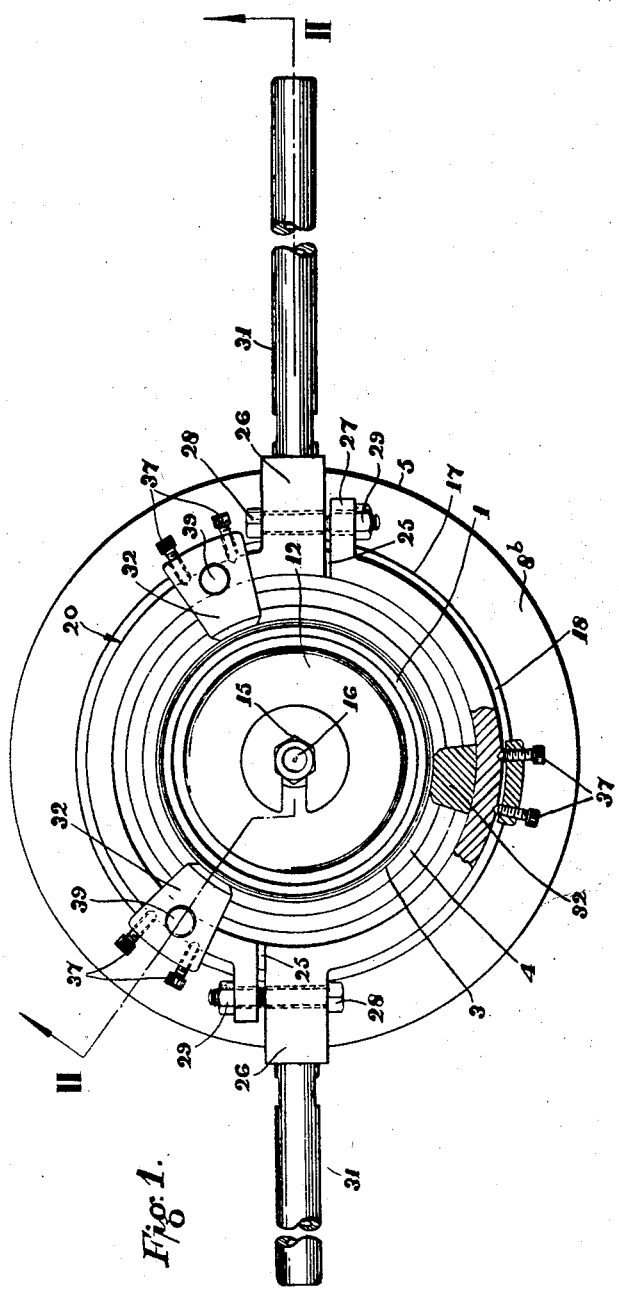
Figure 1 is a plan view, with parts in section, of one form of device including a lap carrier member for carrying out the lapping of the intermediate race ring of a bearing, in accordance with the invention.
Figure 2:
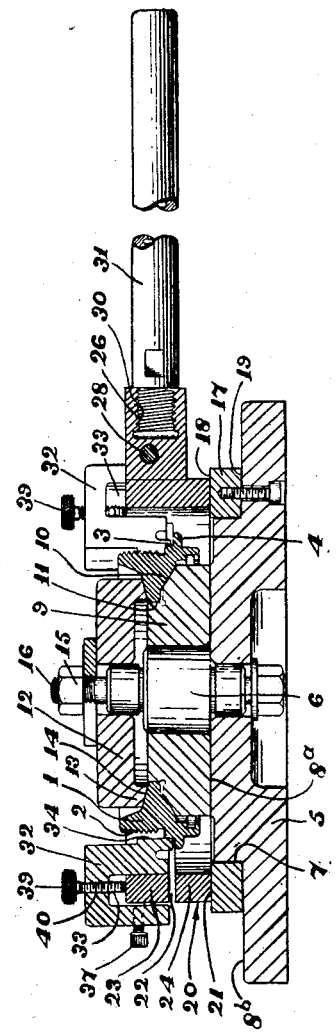
Figure 2 is a vertical section on line II—II, Figure 1.
Figure 3:
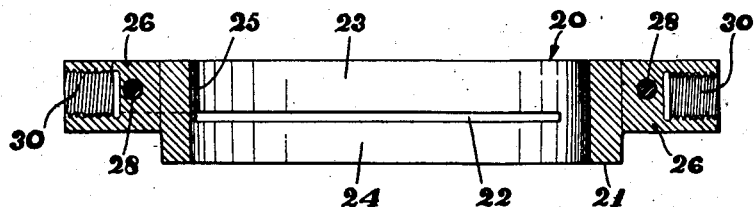
Figure 3 is a diametric vertical section through the lap carrier member alone.
Figure 4:
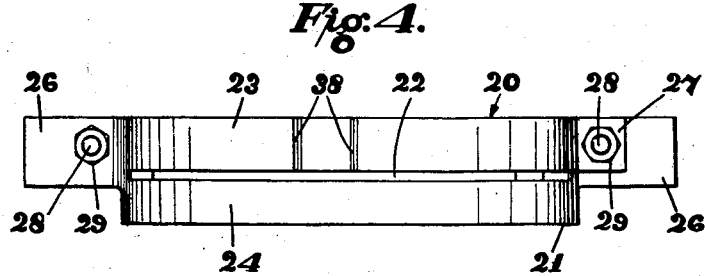
Figure 4 is a side elevation of the lap carrier member.
Figure 5:
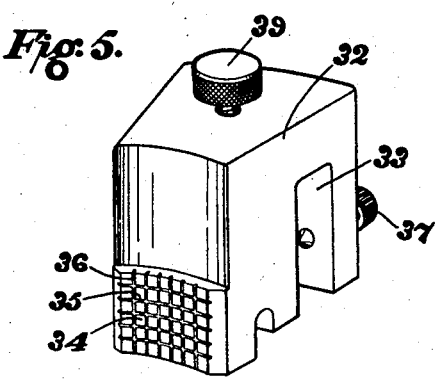
Figure 5 is a perspective view of one of the lapping tools.

Referring to the drawings, the intermediate race-ring workpiece is denoted by the reference numeral 1 and its outer perpihery includes a screw-threaded end portion 2, a short cylindrical portion 3 adjacent to said screw-threaded portion 2 but of larger diameter, and a flange 4 adjacent to said cylindrical portion 3 at the side thereof remote from the screw-threaded portion 2. It is this cylindrical portion 3 of the periphery which is used for locating purposes and which is liable to become expanded and distorted when heavy thrust and bending loads are applied so that rectification becomes necessary.

The device for carrying out the lapping operation comprises a circular base plate 5 which is stepped at 7 to provide upper horizontal flat surfaces $8^a$ and $8^b$ and upon which is mounted a central upstanding spigot 6 whose axis is accurately set perpendicular to said surfaces $8^a$ and $8^b$. Resting upon the central flat surface $8^a$ of the base plate 5 and closely fitting around a portion of the upstanding spigot 6 is a cylindrical supporting member 9 whose upper end is shaped and contoured to engage and fit one of the tapered race tracks 10 and the inner peripheral surface 11 of the intermediate race ring 1, so that when the latter is placed on said supporting member 9 it will be firmly seated with its axis coincident with the vertical axis of the spigot.

Fitting over the upper portion of the spigot 6 is a top clamping member 12 which consists of a circular plate having around its edge a depending flange 13 which is shaped and contoured to mate with the upper race track 14 of the race member 1. This clamping plate 12 is adapted to be forced downwards by a nut 15 on an upper screw-threaded end 16 of the spigot 6, so that when the nut 15 is screwed down hard the race member 1 is firmly clamped between the clamping plate 12 and supporting member 9, with its outer cylindrical locating surface 3 accurately co-axial with the spigot and perpendicular to the base plate upper surfaces $8^a$ and $8^b$.

Closely fitting around the stepped portion 7 on the base plate 5 is a circular bearing ring 17 of hardened steel, having accurately ground parallel upper and lower faces 18 and 19 respectively. This bearing ring 17 is thus co-axially aligned with the spigot 6, and its lower face 19 rests on the horizontal flat surface $8^b$ of the base plate 5 so that its upper face 18 also lies accurately in a horizontal plane.

Freely supported upon this upper face 18 and spaced radially outwards of the spigot 6, is a loose lap carrier ring 20 which is of vertical cylindrical form, its flat lower surface 21 resting squarely on the face 18. This lap carrier ring 20 is divided circumferentially so as to provide two diametrically-opposed circumferential slots 22 which each extends through an arc less than 180°, thereby dividing circumferential portions of the ring 20 into upper and lower sections 23 and 24 respectively.

An upwardly-extending vertical slot 25 at one end of each circumferential slot 22 forms a free end to each upper section 23 of the ring, and a pair of lugs or bosses 26 and 27, secured to the ring by welding and extending radially outwards, are provided adjacent each side edge of the vertical slots 25, with a clamping bolt 28 passing through each pair. These clamping bolts 28 carry a clamping nut 29 and it will be appreciated that by tightening up each of these nuts 29, the upper section 23 of the lap carrier ring 20 can be contracted slightly by virtue of the resiliency imparted by the above-described slotted construction, and the diameter of the said ring can thus be varied within narrow limits by a controlled amount.

Each lug or boss 26 is provided with a screw-threaded socket 30 into which is fitted a radially-directed external handle 31 for manual operation of the device as hereinafter described.

Mounted on the carrier ring 20 are three lapping tools or pads 32 which are disposed at equal distances apart around the circumference. Each lapping tool or pad 32 consists of a cast iron block which is slotted at 33 so as to fit over the edge of the carrier ring 20 and which is formed with a lapping surface 34 directed radially-inwards and of a smooth arcuate form, preferably embracing not more than 20° of arc, and corresponding to the contour of the outer cylindrical surface 3 of the intermediate race ring 1. A series of horizontal and vertical grooves 35 and 36 are, however, formed across each lapping surface 34.

The lapping tools or pads 32 are each located around the circumference of the carrier ring 20 by means of two set screws 37 which engage in two parallel vertical grooves 38 on the outer peripheral surface of the carrier ring. A vertical adjustment of each lapping tool or pad 32 can be made by means of an adjusting screw 39 which passes through a tapped hole 40 and engages the top edge of the carrier ring 20.

In use, with the race ring 1 clamped in position as described, the carrier ring 20, with the three lapping tools or pads 32 mounted thereon, is placed on the bearing ring 17 so as to encircle the said race ring 1. The lapping tools or pads 32 are then adjusted vertically by the screws 39, and the diameter of the ring 20 is adjusted by means of the clamping nuts 29, so that each of the lapping surfaces 34 is brought into contact with the locating peripheral surface 3 of the race ring 1. An abrasive paste or lapping compound may be applied between the lapping surfaces 34 and the said peripheral surface 3 of the race ring, and the lapping of the latter is then performed by an operator loosely holding the handles 31 and oscillating or rotating the carrier ring 20 backwards and forwards, first in one direction and then in the other through as least 120°, until the desired rectification of the race ring surface is achieved. Since the lap-carrier ring 20 rests freely on the surface 18 and is restrained radially only by the three lapping pads 32 contacting the locating surface 3, the lapping pressure at each pad—and therefore the cutting effect of, and the metal removed from the surface by, the pads—varies in accordance with the degree of variation of the distorted surface from its correct cylindrical form, so that both expansion and distortion are rectified during the lapping operation.

As portions of the lapping surface 34 of the pads 32 become worn, the lower part may be cut off, preferably along one of the horizontal grooves 35, and after a corresponding vertical adjustment by means of the screw 39, a fresh portion of the lapping surface 34 may be brought into use.

It will be understood that although only one specific form of device for carrying out the lapping operation has been described, many variations of the particular constructional details of the device may be made within the scope of the invention. The size and form of the lapping tools may naturally be varied.

I claim:

1. A hand-operated portable device, for lapping the outer peripheral surface of an anti-friction bearing race member, comprising a stationary base, supporting and clamping means adapted securely to hold a race member above said base in located position with its axis vertical, and an external lap carrier ring carrying three equally-spaced lapping tools having lapping surfaces directed radially inwards and adapted to engage the outer periphery of a race member supported above the base, said external lap carrier ring being adapted to be rotatably oscillated by hand and being freely supported upon the stationary base so as to be restrained radially solely by the engagement of the lapping tools with the surface being lapped.

2. A hand-operated portable device, for lapping the outer peripheral surface of an anti-friction bearing race member, comprising a stationary base having a flat horizontal top surface, an upstanding spigot carried on said base and surrounded by the flat top surface thereof, a top clamping member mounted on the spigot for clamping the race member in position around the spigot, screw means operable upon the clamping member, an external lap carrier ring freely and floatingly supported on the flat top surface of the base and encircling the spigot, three equally-spaced lapping tools carried by said lap carrier ring and adapted to engage the outer periphery of the race member when the latter is clamped in position whereby the lap carrier ring is restrained radially solely by the engagement of the lapping tools with the race ring, and means for manually rotatably oscillating said lap carrier ring.

3. A hand-operated portable device for lapping the outer periphery of an anti-friction bearing race member, comprising a stationary base having a flat horizontal top surface, an upstanding spigot carried on said base and surrounded by the flat top surface thereof, a cylindrical supporting member resting on the base and fitting around the spigot for supporting the race member to be treated, a top clamping member mounted on the spigot for clamping said race member on to said supporting member, screw means operable upon the said clamping member, an external lap carrier ring freely and floatingly supported on the flat top surface of the base and encircling the said supporting member, three equally-spaced lapping tools carried by said lap carrier ring and adapted to engage the outer periphery of the race member when the latter is clamped in position whereby the lap carrier ring is restrained radially solely by the engagement of the lapping tools with the race ring, and means for manually rotatably oscillating said lap carrier ring.

4. A hand-operated portable lapping device according to claim 2, wherein the means for manually oscillating said lap carrier ring consists of outwardly-directed radial handles carried by said ring.

5. A hand-operated portable device, for lapping the outer peripheral surface of an anti-friction bearing race member, comprising a stationary base, supporting and clamping means adapted securely to hold a bearing race member above said base in located position with its axis vertical, and an external lap carrier ring adapted to be rotatably oscillated by hand and being freely supported upon the base, said carrier ring being slotted circumferentially and vertically to form three upper resilient segments each joined at one end to a continuous circular base portion, screw means for adjusting the free ends of said segments to vary the effective diameter of the upper part of the ring, and three equally-spaced lapping tools carried by the respective resilient segments and adapted to engage the outer periphery of the race member when the latter is clamped in position whereby the lap carrier ring is restrained radially solely by the engagement of the lapping tools with the race ring.

6. A hand-operated portable lapping device according to claim 5, wherein each lapping tool consists of a metal block slotted to fit over one of the resilient upper segments of the lap carrier ring and being provided with a clamping screw.

References Cited in the file of this patent
UNITED STATES PATENTS
2,105,762   Zimmerman _____ Jan. 18, 1938